United States Patent [19]

Nabeshima

[11] 4,394,762

[45] Jul. 19, 1983

[54] PULSE-CODE MODULATION SIGNAL PROCESSING CIRCUIT

[75] Inventor: Daiki Nabeshima, Kamakura, Japan

[73] Assignee: Tokyo Shibaura Denki Kabushiki Kaisha, Kawasaki, Japan

[21] Appl. No.: 222,769

[22] Filed: Jan. 6, 1981

[51] Int. Cl.³ .............................................. G06F 11/10
[52] U.S. Cl. .................................... 371/38; 360/38.1; 360/53; 371/37
[58] Field of Search ................ 371/38, 37; 360/32, 360/38, 53

[56] References Cited

U.S. PATENT DOCUMENTS

| | | | |
|---|---|---|---|
| 4,206,440 | 6/1980 | Doi et al. | 371/38 |
| 4,211,997 | 7/1980 | Rudnick et al. | 371/38 |
| 4,238,852 | 12/1980 | Iga et al. | 371/38 |
| 4,281,355 | 7/1981 | Wada et al. | 360/32 |
| 4,306,305 | 12/1981 | Doi et al. | 371/38 |

*Primary Examiner*—Charles E. Atkinson
*Attorney, Agent, or Firm*—Finnegan, Henderson, Farabow, Garrett & Dunner

[57] ABSTRACT

A PCM signal processing circuit records a predetermined number of PCM signals and also parity signals and a CRC signal after conversion into a signal having a data format conforming to the television signal with a VTR and detects the PCM signals from the reproduced signal from the VTR. In this PCM signal processing circuit, when the preset bit number of the PCM signals is greater than a reference bit number, the number of parity signals is reduced, and extra bit portions of the individual PCM signals are allotted to the vacant parity signal slot obtained as a result of the reduction of the parity signal number.

10 Claims, 6 Drawing Figures

PULSE-CODE MODULATION SIGNAL PROCESSING CIRCUIT

This invention relates to PCM (pulse-code modulation) signal processing circuits and, more particularly, to a PCM signal processing circuit, in which a PCM signal is converted to a signal of a data format comforming to a television signal and this television signal data format signal is converted back to the PCM signal.

Recently, digital techniques have been employed for the recording and reproduction of audio signals. In these techniques, the audio signal is recorded after pulse-code modulation on a magnetic tape or the like. However, the frequency range of the ordinary tape recorder is insufficient for the recording and reproduction of PCM signals. It has been known to use a VTR (video tape recorder) which covers a frequency band of several MHz for the PCM recording and reproduction of audio signals. Since the VTR is designed to record and reproduce television signals, it is necessary for the audio signal to be converted into a signal having a data format conforming to the television signal for recording with the VTR. Thus, it is necessary to use a PCM signal processing circuit for signal conversion between the PCM signal and television signal data format signal. With such a PCM signal processing circuit, the audio signal is sampled at a predetermined period, and the output obtained through the sampling is converted into a digital signal of a plurality of bits, i.e., a sample word. The digital signals are recorded with the VTR. At this time, a predetermined number of sample words (typically 6 sample words which are preferred in view of the frequency characteristics of the VTR is available now) are arranged in each horizontal scanning line period (1 H). Also, since the PCM audio signal in the digital form is subject to drop-out during its recording and reproduction due to such causes as dust contained in the magnetic material of the tape and scars and scratches on the tape surface, error correction words such as parity signals and error detection words such as cyclic redundancy check (CRC) signals are provided in suitable arrangement in the 1 H period for the purpose of detecting and correcting the dropouts. In order to ensure reliable correction, it has been the practice to provide two parity words and one CRC word in the 1 H period.

For a broader dynamic range of the reproduced signal, it is necessary for each sample word to have a greater number of bits. In this case, a VTR capable of recording and reproduction at a higher density is required. However, the home VTR which is the main VTR used for PCM recording is incapable of sufficiently high density recording and reproduction. This means that the number of error correction words has to be reduced to increase the bit number of the sample word. However, since with home VTR's drop-outs frequently occur, it is necessary to provide error correction words having sufficient redundancy. In addition, for increasing the bit number of the sample word an expensive analog-to-digital (A/D) converter is required, and this leads to an increase in price of the PCM recorder.

Because of the above, the present practice is to set the bit number of the sample word to 14 and provide a dynamic range of 85 dB. However, it is expected that the A/D converter will be reduced in price and the home VTR will in the future be improved in regard to drop-out. Also, there will be cases where the dynamic range has to be above 85 dB. In order to meet such situations, a new system in which the error correction word number is reduced and the sample word bit number increased will have to be developed.

However, interchangeability between the conventional system and such a new system is lacking, and this is inconvenient in situations in which both systems are used in combination. In light of this, the development of a system having a performance conforming to both the conventional and new systems is desirable.

An object of the invention is to provide a PCM signal processing circuit, which permits the selection of the sample word bit number for the conversion of the PCM signal into a signal of data format conforming to the television signal and vice versa.

This object is realized by a PCM signal processing circuit which comprises means for producing a control signal according to the bit number of one sample word in the PCM signal, means for receiving a PCM signal and producing an error correction signal with respect to a predetermined number of received PCM signal sample words, means for converting the input PCM signal and error correction signal into a signal having a data format conforming to the television signal in accordance with the control signal and supplying the television signal data format signal to a VTR, and means for detecting the PCM signal and error correction signal from the reproduced signal supplied from the VTR and producing the PCM signal after making correction thereof according to the error correction signal.

This invention can be more fully understood from the following detailed description when taken in conjunction with the accompanying drawings, in which.

Figure 1:
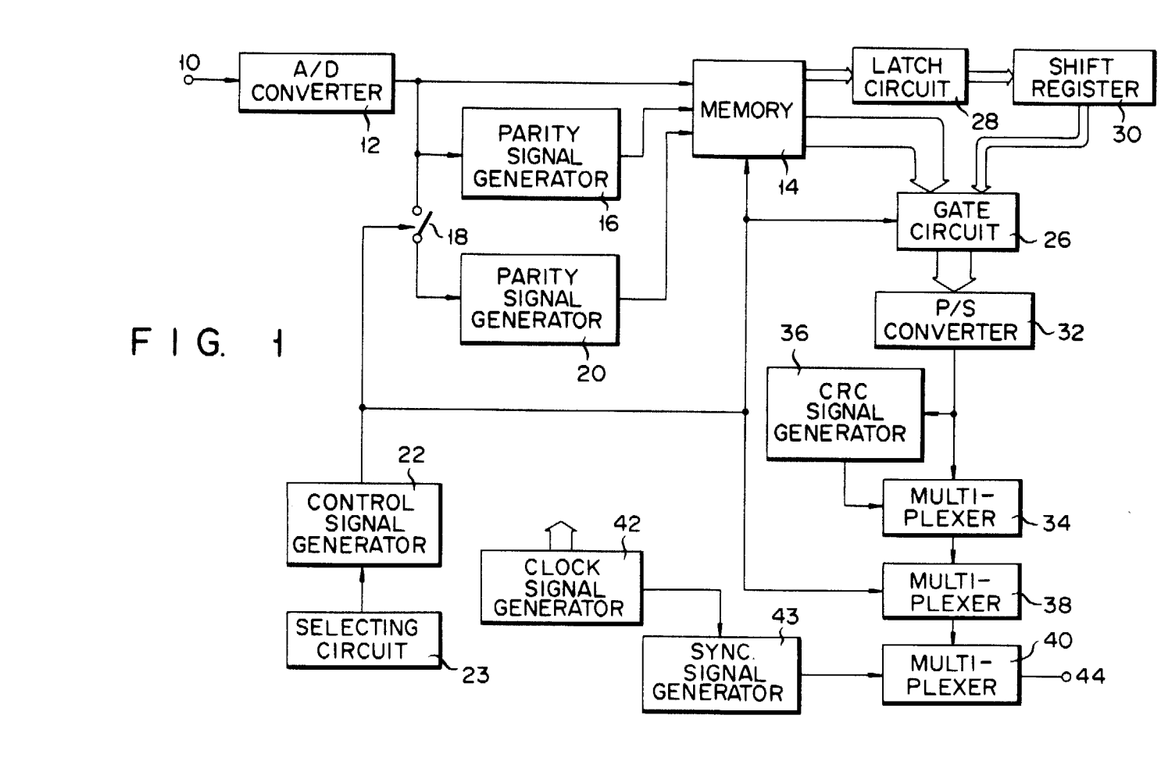
FIG. 1 is a block diagram of a circuit for converting an audio signal into a signal having a data format conforming to the television signal in one embodiment of the PCM signal processing circuit according to the invention.

Now, an embodiment of the pulse-code modulation signal processing circuit according to the invention will be described with reference to accompanying drawings. FIG. 1 shows a block diagram of a circuit, which converts an analog audio signal into a PCM signal and then converts this PCM signal into a signal having a data format conforming to the television signal. An input terminal 10, to which the audio signal is coupled, is connected to the input terminal of an A/D converter 12. The A/D converter 12 samples the input analog audio signal at a predetermined sampling period and converts the sampled signal into a digital signal. The output terminal of the A/D converter 12 is connected to a memory 14 and also connected through a first parity signal generator 16 to the memory 14. It is further connected through a switch 18 to a second parity signal generator 20, the output terminal of which is connected to the memory 14. A control signal generator 22, which produces a control signal corresponding to the bit number of one sample word, is connected to the memory 14 and also to a control terminal of the switch 18. The control signal can have two distinct levels, one for the case when one sample word has 14 bits and the other for the case when the sample word bit number is 16. The switch 18 is closed in the case when the sample word bit number is 14, and it is opened in the 16-bit sample word case. The selection of the sample word bit number can be made by means of operation of a switch (not shown) in a selecting circuit 23. The output of the selecting circuit 23 is coupled to the control signal generator 22. When the sample word bit number is 14, the first and second parity signal generators 16 and 20 are both rendered operative, so that two parity signals are provided in the 1 H period. When the sample word bit number is 16, only the first parity signal generator 16 is rendered operative, so that only one parity signal is provided for the 1 H period.

The memory 14 has 16 bit output terminals. Of these output terminals, those for upper 14 bits are connected to a first input terminal group of a gate circuit 26, and those for lower 2 bits are connected through a latch circuit 28 to the input side of a shift register 30. The output side of the shift register 30 is connected to a second input terminal group of the gate circuit 26. The output terminal of the control signal generator 22 is connected to a control input terminal of the gate circuit 26. The output terminal groups of the gate circuit 26 is connected through a P/S (parallel-to-series) converter 32 to one input terminal of a multiplexer 24. The output terminal of the P/S converter 32 is also connected through a CRC signal generator 36 to the other input terminal of the multiplexer 34.

The output terminal of the multiplexer 34 is connected to one input terminal of a multiplexer 38, and the output terminal of the control signal generator 22 is connected to the other input terminal of the multiplexer 38. The output terminal of the multiplexer 38 is connected to one input terminal of a multiplexer 40. One output terminal of a clock signal generator 42 is connected to the input terminal of a synchronizing signal generator 43, and the output terminal thereof is connected to the other input terminal of the multiplexer 40. The clock signal generator 42 produces clock signals as reference timing signal for the operation of various parts of the circuit. The output terminal of the multiplexer 40 is connected to a video signal input terminal 44 of a VTR.

Figure 2:
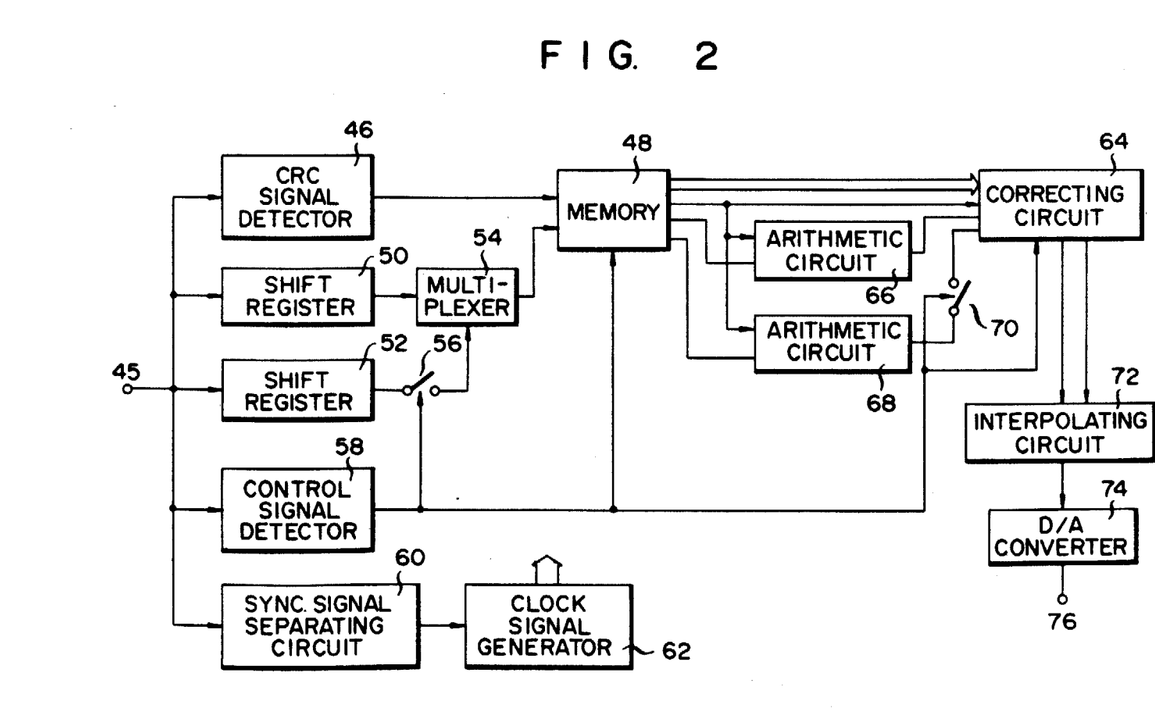
FIG. 2 is a block diagram of a circuit for converting reproduced signal from a VTR into the audio signal in the same embodiment.

FIG. 2 shows a block diagram of a circuit, which converts the PCM output signal reproduced by the VTR into the analog audio signal. A reproduced signal output terminal 45 of the VTR is connected through a CRC signal detector 46 to a memory 48, and it is also connected to the input terminals of shift registers 50 and 52. The output terminal of the shift register 50 is connected to one input terminal of a multiplexer 54, and the output terminal of the other shift register 52 is connected through a switch 56 to the other input terminal of the multiplexer 54. The output terminal of the multiplexer 54 is connected to the memory 48. The reproduced signal output terminal 45 of the VTR is further connected to a control signal detector 58 and to a sync. signal separating circuit 60. The output terminal of the control signal detector 58 is connected to a control terminal of the switch 56. The output terminal of the sync. signal separating circuit 60 is connected to the input terminal of a clock signal generator 62, which produces clock signals as reference timing signal for the operation of various parts of the circuit.

The memory 48 supplies a CRC word output, a sample word output and first and second parity word outputs. The CRC word output and sample word output terminals are coupled to a correcting circuit 64. The first parity word output terminal is coupled to one input terminal of a first arithmetic circuit 66, and the second parity word output terminal is coupled to a first input terminal of a second arithmetic circuit 68. The sample word output terminal is also coupled to a second input terminal of each of the first and second arithmetic circuits 66 and 68. The output terminal of the first arithmetic circuit 66 is directly connected to the correcting circuit 64, and the output terminal of the second arithmetic circuit 68 is connected through a switch 70 to the correcting circuit 64. The output terminal of the control signal generator 58 is connected to a control terminal of the switch 70, and it is also connected to the memory 48 and correcting circuit 64.

The correcting circuit 64 has two output terminals, from which a sample word signal and a correction command signal are respectively produced and coupled to an interpolating circuit 72. The output terminal of the interpolating circuit 72 is connected through a D/A (digital-to-analog) converter 74 to an output terminal 76, which is connected to an external loudspeaker or the like.

Figure 3:
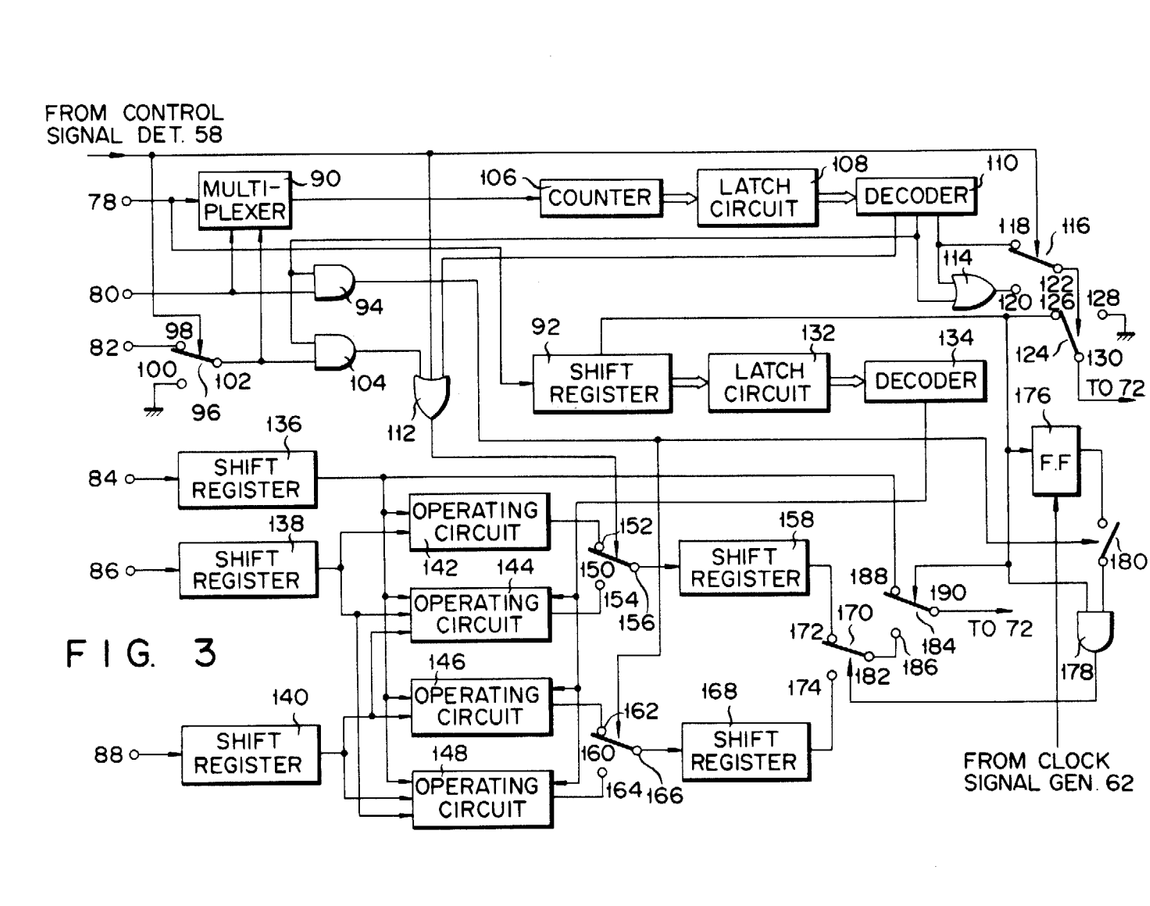
FIG. 3 is a schematic of the detailed circuit construction of a correcting circuit in the circuit of FIG. 2.

FIG. 3 shows a circuit diagram of the detailed circuit construction of the correcting circuit 64. The CRC word signal produced from the afore-mentioned memory 48 consists of a check component with respect to the PCM output signal and check components with respect to the respective first and second parity signals. These check signal components are produced from respective output terminals 78, 80 and 82 of the memory 48. The PCM output signal and first and second parity signals are produced from respective output terminals 85, 86 and 88 of the memory 48. The terminal 78 is connected to a first input terminal of the multiplexer 90 and also to the input terminal of a shift register 92. The terminal 80 is connected to a second terminal of the multiplexer 90 and also to one input terminal of an AND gate 94. The terminal 82 is connected to a first movable contact of a switch 96. A second movable contact of the switch 96 is grounded. A fixed contact 102 of the switch 96 is connected to a third input terminal of the multiplexer 90 and also to one input terminal of an AND gate 104. The output terminal of the control signal detector 58 mentioned above is connected to a control terminal of the switch 96. The output terminal of the multiplexer 90 is connected to the input terminal of a counter 106, and the output side thereof is connected through a latch circuit 108 to a decoder 110. The decoder 110 has three output terminals, with the first output terminal connected to a first input terminal of an OR gate 122, the second output terminal connected to one input terminal of an OR gate 114 and the third output terminal connected to the other input terminal of the OR gate 114 and also to a first movable contact of a switch 116. The output terminal of the control signal generator 58 mentioned above is connected to a second input terminal of the OR gate 112 and also to a control terminal of the switch 116. The output terminal of the OR gate 114 is connected to a second movable contact 120 of the switch 116, and a fixed contact 112 thereof is connected to a control terminal of a switch 124. The output terminal of the AND gate 104 is connected to a third input terminal of the OR gate 112. A serial signal output terminal of the shift register 92 is connected to a first movable contact 126 of the switch 124, a second movable contact thereof is grounded, and a fixed contact 130 thereof is connected to the afore-mentioned interpolating circuit 72. A parallel signal output terminal group of the shift register 92 is connected through a latch circuit 132 to a decoder 134.

The terminals 84, 86 and 88, from which the PCM output signal and first and second parity signals are respectively produced as mentioned earlier, are connected to respective shift registers 136, 138 and 140. The output terminal of the shift register 136 is connected to operating circuits 142, 144, 146 and 148. The output terminal of the shift register 138 is connected to the operating circuits 142, 144 and 148. The output terminal of the shift register 140 is connected to the operating circuits 144, 146 and 148. The output terminal of the decoder 134 is connected to the operating circuits 144, 146 and 148. The output terminals of the operating circuits 142 and 144 are respectively connected to first and second movable contacts 152 and 154 of a switch 150, the output terminal of the OR gate 112 is connected to a control terminal of the switch 150, and a fixed contact 156 thereof is connected to a shift register 158. The output terminals of the operating circuits 146 and 148 are respectively connected to first and second movable contacts 162 and 164 of a switch 160, the output terminal of the AND gate 94 is connected to a control terminal of the switch 160, and a fixed contact thereof is connected to a shift register 168. The shift registers 158 and 168 are respectively connected to first and second movable contacts 172 and 174 of a switch 170.

The serial signal output terminal of the shift register 92 is also connected to set terminal of a flip-flop 176 and to one input terminal of an AND gate 178. The output terminal of the clock signal generator 62 mentioned above is connected to a reset terminal of the flip-flop 176. The output terminal of the flip-flop 176 is connected through a switch 180 to the other input terminal of the AND gate 178. The output terminal of the AND gate 94 is also connected to a control terminal of the switch 180. The output terminal of the AND gate 178 is connected to a control terminal of the switch 170. A fixed contact 182 of the switch 170 is connected to a first movable contact 186 of a switch 184. The output terminal of the shift register 136 is connected to a second movable contact 188 of the switch 184, the serial signal output terminal of the shift register 92 is further connected to a control terminal of the switch 184, and a fixed contact thereof is connected to the afore-mentioned interpolating circuit 72.

The operation of the embodiment having the above construction will now be described. In a television signal for one field (262.5 H), data block for 245 H and control signal block for 1 H are provided. The horizontal and vertical sync. signals are provided in the same form and arrangement as in the standard television signal. 128 bits are provided for 1 H. The data block consists of a sample word, a parity word and a CRC word. The sample word consists of either 14 bits of 16 bits. When the sample word consists of 14 bits, one data block consists of 6 sample words, 2 parity words (each consisting of 14 bits) and 1 CRC word (16 bits). When the sample word consists of 16 bits, one data block consists of 6 sample words, 1 parity word (16 bits) and 1 CRC word (16 bits). In the control block, the control signal that conforms to either one of the two different kinds of the data block is recorded. The output signal of the control signal generator 22 is switched by the operator in accordance with the bit number of one sample word.

Now, the conversion of audio signal into the form comforming to the television signal will be described in conjunction with each of the cases of the two different bit numbers of one sample word. The description is first be made in connection with the case when one sample word consists of 14 bits. The analog audio signal supplied to the input terminal 10 is converted in the A/D converter 12 into a digital signal. It is assumed that the A/D converter 12 has a resolution of 16 bits. Since the switch 18 is kept closed by the control signal in this case, the digital signal output of the A/D converter 12 is coupled to the memory 14 and also to the first and second parity signal generators 16 and 18. The digital signal can be expressed in various systems. Here, a binary signal train is expressed as a polynomial expression of variable x; for instance a signal having a content "1010" is expressed as $x^3+x$. The output signal of the A/D converter 12 is expressed as $S_i(x)$ where i is the number of sampling cycles. The parity signal is a error correction word with respect to sample words in 1 H. Since 6 sample words are provided in 1 H, the parity word is formed on the basis of 6 sample words. Denoting the first and second parity signals by P(x) and Q(x) respectively, they can be generally expressed as $$P(x) = \sum_{i=1}^{6} S_i(x) \qquad (1)$$

and $$Q(x) = \sum_{i=1}^{6} T_i(x) S_i(x). \qquad (2)$$

Here, the summation is that of MOD 2, and $T_i(x)$ is an operand for shifting $S_i(x)$.

These signals are coupled to the memory 14 for interleaving. More particularly, if the recorded signal conforming to the television signal consists of words $S_{in}(x)$, $P_n(x)$ and $Q_n(x)$ in the n-th 1 H period, these words are read out in the order of $S_{1\,n}(x)$, $S_{2\,n+1}(x)$, ..., $S_{6\,n+5}(x)$, $P_{n+6}(x)$ and $Q_{n+7}(x)$ in the 1 H period. Since each word consists of 14 bits omitting the lower 2 of 16 bits and the gate circuit 26 has its first input terminal group connected to the upper bit output terminal group of the memory 14, the output signal of the memory 14 is supplied to the P/S converter 32, as it is. The CRC signal generator 36 produces as error detection word a 16-bit remainder of the division of the 8-wrod 112-bit signal in the 1 H period, i.e., a signal row consisting of the word $S_{1\,n}(x)$, $S_{2\,n+1}(x)$, ..., $S_{6\,n+5}(x)$, $P_{n+6}(x)$ and $Q_{n+7}(x)$, by a polynomial $G(x)=x^{16}+x^{12}+x^5+1$. In the multiplexer 34, this 16-bit CRC word is inserted at the end of each 1 H period, i.e., after the word $Q_{n+7}(x)$. Also, in the multiplexer 38, the output signal of the control signal generator 22 is inserted in predetermined 1 H period in each field. (For example, a low (L) level signal is inserted in case when one sample word consists of 14 bits, and a high (H) level signal is inserted in the case of the 16-bit sample word.) Further, in the multiplexer 40, the horizontal and vertical sync. signals are inserted in predetermined positions. The resultant PCM output signal which has a data format conforming to the television signal is obtained at the terminal 42 for PCM recording with a VTR.

In case when the sample word bit number is 16, in which case the switch 18 is opened, the second parity signal Q(x) is not produced. That is, in this case the 1 H period signal obtained through the interleaving in the memory 14 is a 7 word 112-bit signal consisting of six 16-bit sample words $S_{1n}(x), S_{2n+1}(x), \ldots, S_{6n+5}(x)$ and one 16-bit parity word $P_{n+6}(x)$. Of each word, the upper 14 bits are coupled to the first input terminal group of the gate circuit 26, and the lower 2 bits are temporarily latched in the latch circuit 28 to be coupled through the shift register 30 to the second input terminal group of the gate circuit 26. To the gate circuit 26, the first 98 bits in each 1 H period are coupled to the first input terminal side, and the remaining 30 bits are coupled to the second input terminal side. Thus, denoting 14 bits as one slot, the upper 14-bit portions of the individual signals $S_{1n}(x), S_{2n+1}(x), \ldots, S_{6n+5}(x)$ and $P_{n+6}(x)$ are allotted to the first 7 slots of the output signal of the gate circuit 26 in one 1 H period, the lower 2-bit portions of these 7 words are allotted to the next one slot, and the reamining 16 bits in the 1 H period are allotted to the CRC word inserted in the multiplexer 34. In other words, in the case of the 16-bit sample word, the lower 2-bit portions of the sample words and parity word are allotted to the slot for the second parity words Q(x) in the case of the 14-bit sample word.

Now, the processing involved in the conversion of the television signal data format signal into the initial audio signal will be described with reference to FIGS. 2 and 3. The description will be first made in connection with the case of the 14-bit sample word. The reproduced signal supplied from the VTR to the terminal 45 is coupled to the control signal detector 58, so that the control signal is determined to be that for the 14-bit or 16-bit sample word case. Since in this case the sample word bit number is 14, the switch 56 is opened. Thus, the reproduced signal from the VTR is coupled through the shift register 50 and multiplexer 54 to the memory 48, as it is. It is also coupled to the CRC signal detector 46 and to the sync. signal separating circuit 60. The CRC signal detector 46 detects the number of errors in one 1 H period from the CRC signal, and the sync. signal separating circuit 60 separates the horizontal and vertical sync. signal. The clock signal generator 62 produces predetermined clock signals in synchronism to the horizontal and vertical sync. signals supplied to it. The output of the CRC signal detector 46, representing the number of errors in one 1 H period, is coupled to the memory 48. The memory 48 effects de-interleaving of the individual words for supplying them as $S_i(x)$ (i=1, 2, ..., 6) for each 1 H period in the same order as they are produced from the A/D converter 12 in FIG. 1 from its terminal 84 to the correcting circuit 64. In the case of the 14-bit sample wrod, in which case two parity signal are provided in the 1 H period, the switch 70 is closed, and the signal $S_i(x)$ is also coupled to the first and second arithmetic circuits 66 and 68. The errors in the 1 H period are sorted by the first and second parity signals P(x) and Q(x) into those in the sample words $S_i(x)$, those in P(x) and those in Q(x), and data representing the numbers of these sorted errors are coupled from the respective terminals 78, 80 and 82 to the correcting circuit 64. The first and second arithmetic circuits 66 and 68 supply respective syndrome signals P*(x) and Q*(x) expressed as $$P^*(x) = \hat{P}(x) \oplus \sum_{i=1}^{6} \hat{S}_i(x) \tag{3}$$

and $$Q^*(x) = \hat{Q}(x) \oplus \sum_{i=1}^{6} T_i(x) \hat{S}_i(x) \tag{4}$$

where the symbol $\wedge$ indicates that the relevant signal is a reproduced signal, from their terminals 86 and 88 to the correcting circuit 64.

Since the signals P(x) and Q(x) are parity signals, the syndrome signals P*(x) and Q*(x) are both zero if the reproduced signal contains no error. In the instant case, two parity signals are provided in the 1 H period, so that error correction is possible if the number of errors contained in the sample words in the 1 H period is not greater than 2. If the number of errors is greater than 2, interpolation is effected through the interpolating circuit 72. Now, the case when one error is contained in the sample words in the 1 H period will be described. If an error is contained in the sample word $\hat{S}_j(x)$, $$\hat{S}_j(x) = S_j(x) \oplus E(x)$$

From equations (1) and (3) we have $$P^*(x) = P(x) \oplus E(x) \oplus \sum_{i=1}^{6} S_i(x)$$
$$= P(x) \oplus E(x) \oplus P(x)$$
$$= E(x)$$
Hence, $S_j(x) = \hat{S}_j(x) + P^*(x) \tag{5}$ Similarly, from equations (2) and (4) we have $$Q^*(x) = Q(x) \oplus T_j(x) S_j(x) \oplus \sum_{i=1}^{6} T_i(x) S_i(x)$$
$$= Q(x) \oplus T_j(x) E(x) \oplus Q(x)$$
$$= T_j(x) E(x)$$
Hence, $S_j(x) = \hat{S}_j(x) + Q^*(x)/T_j(x) \tag{6}$ Thus, in case when a single error is contained in the sample words in the 1 H period, the error correction can be made according to equation (5) or (6) even if there is an error in either one of the two parity words.

Now, the case when two errors are contained in the sample words in the 1 H period will be described. If errors are contained in signals $\hat{S}_j(x)$ and $\hat{S}_k(x)$, $$\hat{S}_j(x) = S_j(x) + E_j(x)$$

and $$\hat{S}_k(x) = S_k(x) + E_k(x)$$

From equations (1) and (3) we have $$P^*(x) = \hat{P}(x) \oplus E_j(x) \oplus E_k(x) \oplus \sum_{i=1}^{6} S_i(x) \tag{7}$$
$$= \hat{P}(x) \oplus E_j(x) \oplus E_k(x) \oplus P(x)$$
$$= E_j(x) \oplus E_k(x)$$

also, from equations (2) and (4)

$$\hat{Q}^*(x) = Q(x) \oplus T_j(x) E_j(x) \oplus T_k(x) E_k(x) \oplus \sum_{i=1}^{6} T_i S_i(x) \quad (8)$$

$$= T_j(x) E_j(x) \oplus T_k(x) E_k(x)$$

From equations (7) and (8)

$$E_j = \frac{T_k(x) P^* \oplus Q^*}{T_j(x) \oplus T_k(x)} \quad (9)$$

and $$E_k = \frac{T_j(x) P^* \oplus Q^*}{T_j(x) \oplus T_k(x)} \quad (10)$$

Hence, $$S_j(x) = \hat{S}_j(x) + \frac{T_k(x) P^* \oplus Q^*}{T_j(x) \oplus T_k(x)} \quad (11)$$

and $$S_k(x) = \hat{S}_k(x) + \frac{T_j(x) P^* \oplus Q^*}{T_j(x) \oplus T_k(x)} \quad (12)$$

Thus, in case when two errors are contained in the sample words in the 1 H period, the error correction can be made according to equations (11) and (12). In this case, however, it is necessary that no error is contained in the parity words.

The operating circuits 142, 144, 146 and 148 in the correcting circuit 64 respectively produce the results of operations based on equations (5), (11), (6) and (12).

Meanwhile, the control signal showing that one sample word consists of 14 or 16 bits is supplied to the correcting circuit 64. The switch 96 is switched such that the terminal 82 is connected to the input terminal of the AND gate 104 in the 14-bit sample word case and the ground terminal is connected to the input terminal of the AND gate 104 in the 16-bit sample word case. Since the instant case is that of 14-bit sample words, the data representing the number of errors in the second parity word signal Q(x) is coupled to the third input terminal of the multiplexer 90 and also to one input terminal of the AND gate 104. In the multiplexer 90, the number of errors in the sample words, that in the P(x) parity word and that in the Q(x) parity word are added together, and the sum is counted in the counter 106. The count obtained therefrom is coupled to the decoder 110, which produces one of three, namely first to third, output signals in accordance with the number of errors. The third output signal of the decoder 110 is coupled through the switch 116 to the control terminal of the switch 124. Also, the data representing the number of errors in the sample words only is coupled through the shift register 92 and latch circuit 132 to the decoder 134. The serial output signal from the shift register 92 represents the position of sample words with errors. The output of the decoder 134, which is coupled to the operating circuits 144, 146 and 148, specifies the constants $T_j(x)$ and $T_k(x)$ depending upon the positions of errors.

Now, the case when one error is contained in the 1 H period will be described. When one error is contained in the sample words in the 1 H period while the parity words in this period are free from error, the outputs of the AND gates 94 and 104 are at the L level. The L output signal from the AND gate 94 sets the switch 160 to connect the output terminal of the operating circuit 148 to the shift register 168. Also, the decoder 110 produces an H level signal as its first output signal, which is coupled through the OR gate 112 to the control terminal of the switch 150, thus setting the switch 150 to connect the output terminal of the operating circuit 142 to the shift register 158. Further, with the L level output signal of the AND gate 94 the switch 180 is closed. As a result, the output of the AND gate 178 is inverted to an H level depending upon the state of the serial output terminal of the shift register 92, thus setting the switch 170 such as to connect the output terminal of the shift register 158 to the first movable contact of the switch 184. The switch 184 is switched according to the serial output signal of the shift register 92. More particularly, when the output signal of the shift register 92 is at the L level, i.e., when there is no error, the switch 184 is switched to connect the output terminal of the shift register 136, in which the reproduced sample words $\hat{S}_j(x)$ are stored, to the interpolating circuit 72, while when the output signal of the shift register 92 is at the H level, i.e., when there is an error, it is switched to connect the fixed contact 182 of the switch 170 to the interpolating circuit 72. Thus, for the sample word with an error, not the signal $\hat{S}_j(x)$ but the output signal of the operating circuit 142, i.e., $S_j(x)$ in equation (5), is produced.

When the parity words contain an error, there is no need of making any correction. In this case, the serial output of the shift register 92 is always at the L level, so that the switch 184 is held in a state, in which the output terminal of the shift register 136 is connected to the interpolating circuit 72.

The case when two errors are contained in the 1 H period will be described. When two errors are contained in the sample words in the 1 H period while the parity words are free from error, the outputs of the OR gate 112 and AND gate 94 are at the L level. Thus, the switch 150 is turned to a state in which the operating circuit 144 is connected to the shift register 158, and the switch 160 is turned to a state in which the operating circuit 148 is connected to the shift register 168. When the shift register 92 produces an H level signal as its serial signal output, the output of the shift register 158 is coupled through the switches 170 and 184 to the interpolating circuit 72. When the shift register 92 produces the next H level serial signal output, the switch 170 is switched by the action of the flip-flop 176, so that the output terminal of the shift register 168 is connected to the interpolating circuit 72. It is to be understood that when errors are contained in two sample words $S_j(x)$ and $S_k(x)$, $S_j(x)$ in equation (11) produced for the first error word $S_j(x)$, and $S_j(x)$ in equation (12) is produced for the second error word $S_j(x)$.

When either one of the parity words is erroneous, the error correction can be made insofar as there is only one error sample word. For example, when the first parity word P(x) is erroneous, the AND gate 94 produces an H level output, thus setting the switch 160 to a state in which the operating circuit 146 is connected to the shift register 168 and opening the switch 180. Thus, when the shift register 92 produces an H level serial signal output, the output terminal of the shift register 168 is connected to the interpolating circuit 72. Consequently, the erroneous sample word is corrected on the basis of equation (6) involving Q(x). When the second parity word Q(x) is erroneous, the erroneous sample word is connected on the basis of equation (5) involving P(x).

When three or more errors are contained in the 1 H period, the decoder 110 produces an H level signal as its third output signal. Thus, the switch 124 is set to connect the shift register 92 to the interpolating circuit 72. Consequently, the serial signal output is supplied as an error pointer to the shift register 92. Also, the switch 184 is switched to couple the output signal $S_i(x)$ of the shift register 136 to the interpolating circuit 72 for the sound sample word and couple the output signal of one of the operating circuits 142, 144, 146 and 148 for the erroneous sample word. The interpolating circuit 72 effects interpolation for the sample word with error pointer by well-known techniques.

As has been shown, in case when one sample word consists of 14 bits, in which case two parity signals are provided in the 1 H period, eror correction can be made if the number of errors in the sample words in the 1 H period is not greater than two. Also, in this embodiment, if three or more sample word errors are contained in the 1 H period, the adverse effects of the errors can be minimized through the interpolation.

Now, the conversion of signal will be described in connection with the case when one sample word consists of 16 bits. In this case, the switch 56 shown in FIG. 2 is held closed. The shift register 50 produces signal only for the first 98 bits in the 1 H period, and the shift register 52 produces signal for the next 14 bits in the 1 H period. In the multiplexer 54, 2 bits of the output signal from the shift register 52 are inserted after every 14 bits of the output signal from the shift register 50. In other words, an 1 H period signal written in the memory 48 consists of six 16-bit sample words and one 16-bit parity word arranged in the mentioned order. This signal is de-interleaved in the memory 48 and coupled as a signal $S_i(x)$ ($i=1, 2, \ldots, 6$) having the same arrangement for each 1 H period as the output of the A/D converter 12 shown in FIG. 1 to the correcting circuit 64.

In the correcting circuit 64, the switch 96 is held with its grounded contact connected to the AND gate 104, and the switch 116 is held such that the output terminal of the OR gate 114 is connected to the control terminal of the switch 124. Since in the instant case only a single parity word is provided for each 1 H period, the error correction can be made only in case when a single error is contained in the 1 H period. When the parity word is not erroneous, the output of the AND gate 94 is at the L level, so that the switch 160 is held such that the output terminal of the operating circuit 148 is connected to the shift register 168. When the decoder 110 produces an H level signal as its first output signal, the output of the OR gate 112 is inverted to the H level, thus turning the switch 150 to a state in which the output terminal of the operating circuit 142 is connected to the shift register 158. When the serial output of the shift register 94 is inverted to the H level in accordance with a sample word error, the output of the shift register 158 is coupled through the switches 170 and 184 to the interpolating circuit 72. Thus, correction of the erroenous sample word is effected on the basis of equation (5).

When there is no sample word error but the single parity word is erroneous, the switch 190 is held such that the output terminal of the shift register 136 is connected to the interpolating circuit 72 as mentioned earlier.

When there are two erroneous words in the 1 H period, the decoder 110 produces an H level signal as its second output signal, and the switch 124 is held such that the serial output terminal of the shift register 92 is connected to the interpolating circuit 72. Thus, interpolation is effected like the case when the sample word bit number is 14.

Figure 4:
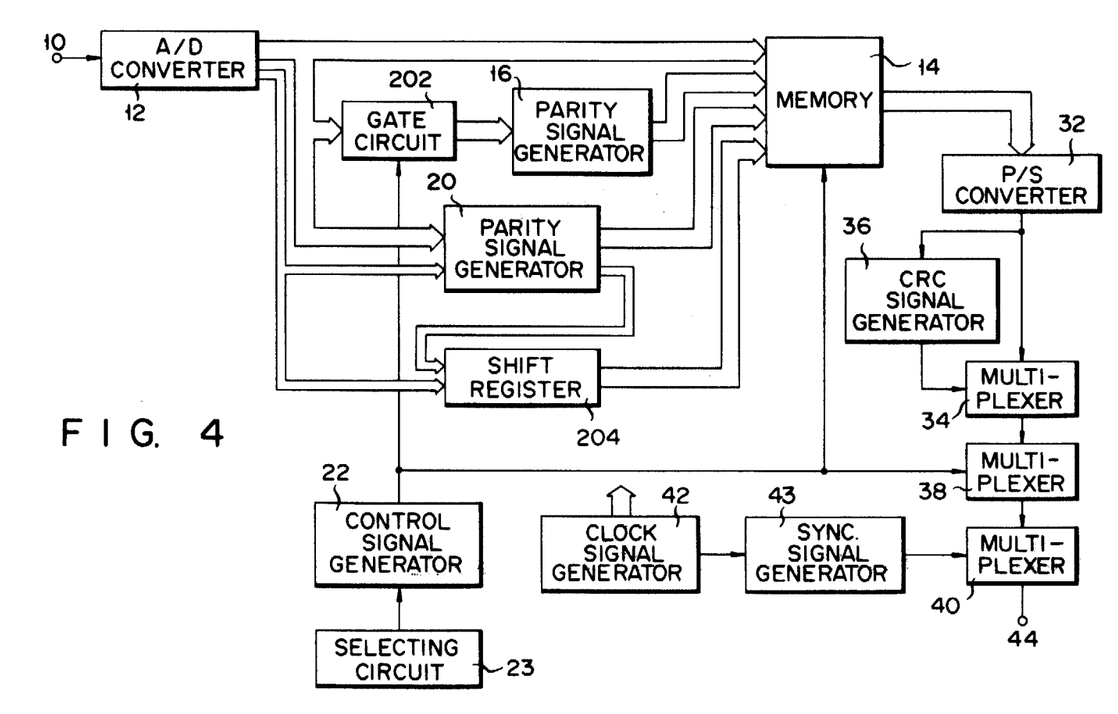
FIG. 4 is a block diagram of a circuit for converting an audio signal into a signal having a data format conforming to the television signal in a second embodiment of the PCM signal processing circuit according to the invention.

Now, a second embodiment of the invention will be described with reference to FIGS. 4 through 6. Parts corresponding to those in the preceding first embodiment are designated by like reference numerals, and their detailed description is omitted. The block diagram of FIG. 4 corresponds to that of FIG. 1. An A/D converter 12 produces separate parallel output signals for the upper 14-bit lower 2-bit portions of the individual words. The upper 14-bit portion output signal is coupled to a memory 14 and also coupled through a gate circuit 202 and first parity signal generator 16 to the memory 14. The upper 14-bit and lower 2-bit portion output signals of the A/D converter 12 are coupled to a second parity signal generator 20. The second parity signal generator 20 also produces separate parallel output signal for the upper 14-bit and lower 2-bit portions of the individual words. The upper 14-bit portion output signal is coupled to the memory 14. The lower 2-bit portion output signal is coupled to a shift register 204. The lower 2-bit portion output signal of the A/D converter 12 is also connected to the shift register 204. The shift register 204 produces a 16-bit output signal which is coupled to the memory 14. The memory 14 produces a 14-bit output signal which is coupled to a P/S converter 32. The part of the circuit after the P/S converter 32 is the same as that shown in FIG. 1.

Figure 5:
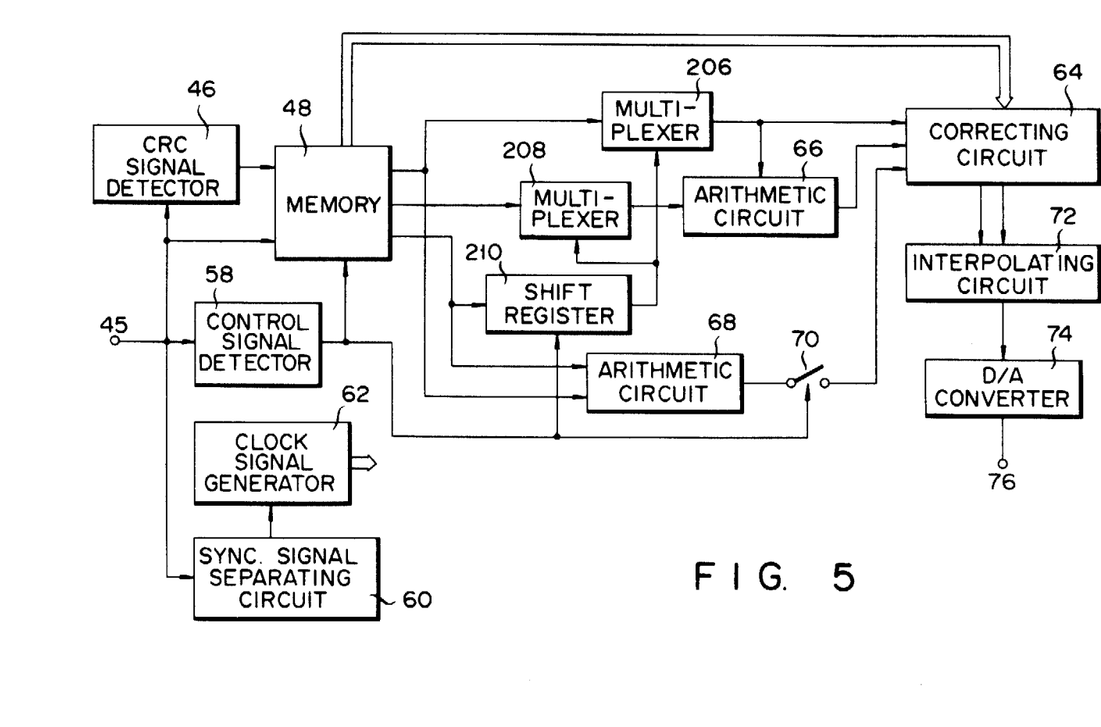
FIG. 5 is a block diagram of a circuit for converting reproduced signal from a VTR into the audio signal in the second embodiment.

The block diagram of FIG. 5 corresponds to that of FIG. 2. In this circuit, unlike the circuit of FIG. 2, reproduced output terminal 45 of the VTR is directly connected to memory 48 without the agency of the shift registers 50 and 52. From the memory 48, the sample word output signal is coupled to one input terminal of the multiplexer 206, the first parity word output signal is coupled to one input terminal of the multiplexer 208, and the second parity word output signal is coupled to the input terminal of the shift register 210. The output signal of a control signal detector 58 is coupled to a control terminal of a shift register 210. The output signal of the shift register 210 is coupled to the other input terminal of each of the multiplexers 206 and 208. The output signal of the multiplexer 206 is coupled to a correcting circuit 64 and also to one input terminal of a first arithmetic circuit 60. The output signal of the multiplexer 208 is coupled to the other input terminal of the first arithmetic circuit 66, and the output signal thereof is coupled to the correcting circuit 64. The sample word output signal and second parity word output signal of the memory 48 are coupled to second arithmetic circuit 68, and the output signal thereof is coupled through a switch 70 to the correcting circuit 64. The part of the circuit after the correcting circuit 64 is the same as in the circuit of FIG. 2.

Figure 6:
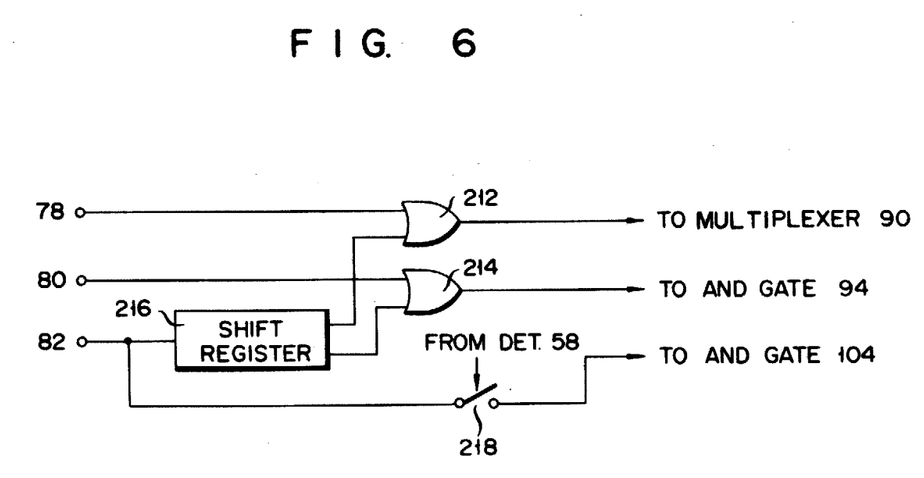
FIG. 6 is a connection diagram showing a different portion of the correcting circuit shown in FIG. 5 from that shown in FIG. 3.

As shown in FIG. 6, the output signal of the multiplexer 206, i.e., sample word output signal, is coupled through terminal 78 to one input terminal of an OR gate 212. The output signal of the first arithmetic circuit 66, i.e., the first parity word output signal, is coupled through a terminal 80 to one input terminal of an OR gate 214. The output signal of the second arithmetic circuit 68, i.e., the second parity word output signal, is coupled through a terminal 82 to the input terminal of a shift register 216 and also coupled through a switch 218 to one input terminal of an AND gate 104. The output signal of control signal detector 58 is coupled to a control terminal of the switch 218. The output signal of the OR gate 212 is coupled to one input terminal of a multiplexer 90, and the output signal of the OR gate 214 is coupled to one input terminal of an AND gate 94.

The operation of the second embodiment will now be described. The operation of converting an audio signal into a signal having a data format conforming to the television signal will first be described with reference to FIG. 4. In case when the sample word bit number is 14, the gate circuit 202 is held in the conductive state and the lower 2-bit output signal mentiond above is not produced from the A/D converter 12. Thus, in this case the operation is the same as in the first embodiment. When the sample word bit number is 16, the gate circuit 202 is held non-conductive. The first parity signal generator 20 produces the 16-bit parity signal P(x), and the upper 14-bit portion thereof is coupled to the memory 14. The lower 2-bit portion of the parity signal P(x) is coupled to the shift register 204 and added to the lower 2-bit portion of the output signal of the A/D converter 12. The shift register 204 supplies a 14-bit parallel output signal, which consists of six lower 2-bit portions of the output signal of the A/D converter 12 and one lower 2-bit portion of the output signal of the first parity signal generator 20 arranged in the mentioned order, to the memory 14 for each 1 H period. In other words, in this embodiment the allotting of the lower 2 bits of the individual 16-bit sample words to the slot for the second parity signal Q(x) is effected before the interleaving.

Now, the operation of converting the reproduced output signal from the VTR into the original PCM signal will be described with reference to FIG. 5. In case when the sample word bit number is 14, the switch 70 is held closed. The memory 48 de-interleaves the reproduced output signal from the VTR to produce the individual 14-bit words. The signal in the second parity word slot is coupled to the shift register 210, and the shift register 210 produces nothing at this time. Thus, the sample word signal and first parity signal are directly coupled through the respective multiplexers 206 and 208. In other words, in the 14-bit sample word case the operation is the same as in the first embodiment. In case when the sample word bit number is 16, the switch 70 is held opened, and the memory 48 produces the individual 16-bit words. The shift register 210 couples the upper 14-bit portion of the 16-bit second parity word to the multiplexer 206 and the lower 2-bit portion of the input to the multiplexer 208. In the multiplexer 206 2 bits of the output signal of the shift register 210 are inserted after each output sample word from the memory 48, and in the shift register 208 2 bits of the output signal of the shift register 210 are inserted after each first parity word. The multiplexer 206 supplies each sample word at 16-bit word to the correcting circuit 64, and the multiplexer 208 supplies the first parity word as 16-bit word to the first arithmetic circuit 66. In other words, in this embodiment the operation of returning the lower 2-bit portion of each sample word from the slot for the second parity signal to the original sample word is effected after the de-interleaving.

The afore-mentioned bit numbers of one sample word and also the number of parity words in the 1 H period are determined for the purpose of illustration only and are by no means limitative. Also, the position of the slot, to which the extra bits in case when the sample word bit number is increased are to be allotted, and also the data format of the parity signal and CRC signal are not limited to those described. Further, the way of interleaving and de-interleaving in memory is not limited to that described above.

What is claimed is:

1. A signal processing circuit for recording PCM signals, comprising:
    A/D coverting means for sampling at a predetermined frequency analog signals to be recorded and converting sampled signals into digital signals forming sample words;
    mode determining means for generating a first mode signal when a sample word from the A/D converting means consists of N bits, where N is a positive integer, and a second mode signal when a sample word from the A/D converting means consists of N+M bits, where M is a positive integer;
    error correction word generating means connected to said A/D converting means and mode determining means for generating, in response to a first mode signal, K+L error correction words, each consisting of N bits, and where K and L are positive integers, for a predetermined number of N-bit sample words and for generating, in response to a second mode signal, K error correction words each consisting of M+N bits for the same number of (M+N)-bit words as that of the N-bit sample words;
    first memory means connected to said A/D converting means and said error correction word generating means for interleaving error correction words among the sample words corresponding thereto;
    arranging means to desired PCM signals connected to said first memory means and mode determining means for allotting, in response to a first mode signal, first by said predetermined number of N-bit sample words and then secondly the K+L error correction words to one horizontal scanning segment of a television signal and for dividing, in response to a second mode signal, each of the sample words and error correction words into an M-bit component and an N-bit component and then allotting to the horizontal scanning segment the M-bit components of said predetermined number of sample words, the M-bit components of K error correction words, the N-bit components of said predetermined number of sample words, and the N-bit components of K error correction words in that order, thereby allotting N-bit components of said predetermined number of said sample words and the N-bit components of K error correction words to a slot to which L error correction words are allotted in response to a first mode signal; and
    means for recording on a video tape the PCM output signals from said arranging means and mode determining means in a form which is adapted to a data format for the television signal.

2. A signal processing circuit according to claim 1 wherein said first memory means outputs an (M+N)-bit parallel signal, and said arranging means has a shift register of the series-in/parallel-out type connected to receive N-bit components from said first memory means and a gate having two input terminals connected respectively to the M-bit output of said first memory means and the output of the shift register, and a control terminal connected to said mode determining means, said gate allowing the passage of the output signal from said first memory means in response to a first mode signal and allowing first the passage of the output signal from said first memory means and then the passage of the output signal from the shift register in response to a second mode signal.

3. A signal processing circuit according to claim 1 wherein said error correction words generating means includes a first generator connected to the output terminal of said sample word generating means for producing a first group of parity words on the basis of the predetermined number of words, and a second generator connected to the output terminal of said word generating means and said mode determining means for producing a second group of parity words on the basis of the predetermined number of sample words in accordance with a second mode.

4. A signal processing circuit according to claim 1, wherein said recording means further includes a third generator connected to said arranging means for producing a cyclic redundancy check signal by processing the output signal from said arranging means in each horizontal scanning segment in the television signal with an operand.

5. A signal processing circuit according to claim 1, further comprising:
  reproducing means to reproduce the recorded PCM output signals having detecting means for detecting sample words and error correction words from one horizontal scanning segment of a signal reproduced from the video tape;
  second memory means for deinterleaving the sample words and error correction words output from said detecting means;
  error correcting means for error-correcting the words output from said second memory means;
  D/A converting means for converting the digital output signals from said error correcting means into analog signals.

6. A signal processing circuit according to claim 5 wherein said first memory means outputs an (M+N)-bit parallel signal, and said arranging means has a shift register of the series-in/parallel-out type connected to receive N-bit components from said first memory means and a gate having two input terminals connected respectively to the M-bit output of said first memory means and the output of the shift register, and a control terminal connected to said mode determining means, said gate allowing the passage of the output signal from said first memory means in response to a first mode signal and allowing first the passage of the output signal from said first memory means and then the passage of the output signal from the shift register in response to a second mode signal.

7. A signal processing circuit for recording PCM signals, comprising:
  A/D converting means for sampling at a predetermined frequency analog signals to be recorded and converting sampled signals into a digital signal forming sample words;
  mode determining means for generating a first mode signal when a word from the A/D converting means consists of N bits, where N is a positive integer, and a second mode signal when a word from the A/D converting means consists of N+M bits, where M is a positive integer;
  error correction word generating means connected to said A/D converting means and mode determining means for generating, in response to a first mode signal, K+L error correction words, each consisting of N bits, and where K and L are positive integers, for a predetermined number of N-bit sample words and for generating, in response to a second mode signal, K error correction words each consisting of M+N bits for the same number of (M+L)-bit words as that of the N-bit words;
  arranging means connected to said A/D converting means and said error correction word generating means for allotting, in response to a first mode signal, first by said predetermined number of N-bit sample words and secondly K+L error correction words to one horizontal scanning segment of a television signal and for dividing, in response to a second mode signal, each of the sample words and error correction words into an M-bit component and an N-bit component and then allotting to the horizontal scanning segment the M-bit components of said predetermined number of sample words, the M-bit components of K error correction words, the N-bit components of said predetermined number of sample words and the N-bit components of K error correction words in that order, thereby allotting the N-bit components of said predetermined number of sample words and the N-bit components of K error correction words to a slot to which L error correction words are allotted in response to a first mode signal;
  first memory means for interleaving each word in the horizontal scanning segment output from said arranging means; and
  means for recording on a video tape the PCM output signals from said first memory means and mode determining means in a form which is adapted to a data format for the television signal.

8. A signal processing circuit according to claim 7 further comprising:
  reproducing means to reproduce the recorded PCM output signals;
  second memory means for deinterleaving the PCM signals reproduced from the video tape;
  detecting means for detecting sample words and error correction words from one horizontal scanning segment of an output signal from said second memory means;
  error correcting means for error-correcting the sample words output from said second memory means; and
  D/A converting means for converting the digital output signals from said error correcting means to analog signals.

9. A signal processing circuit according to claim 7 wherein said error correction words generating means includes a first generator connected to the output terminal of said sample word generating means for producing a first group of parity words on the basis of the predetermined number of sample words, and a second generator connected to the output terminal of said sample word generating means and said mode determining means for producing a second group of parity words on the basis of the predetermined number of words in accordance with a second mode.

10. A signal processing circuit according to claim 7 wherein said recording means further includes a third generator connected to said first memory means for producing a cyclic redundancy check signal by processing the output signal from said first memory means in each horizontal scanning segment in the television signal with an operand.

* * * * *